(12) United States Patent
Zhang et al.

(10) Patent No.: US 9,172,475 B2
(45) Date of Patent: Oct. 27, 2015

(54) METHOD AND APPARATUS FOR EQUALIZING LINK PERFORMANCE

(71) Applicant: Huawei Technologies Co., Ltd., Shenzhen (CN)

(72) Inventors: Sen Zhang, Shenzhen (CN); Zhiyong Feng, Shenzhen (CN); Jianrui Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/318,356

(22) Filed: Jun. 27, 2014

(65) Prior Publication Data

US 2014/0314405 A1 Oct. 23, 2014

Related U.S. Application Data

(63) Continuation of application No. PCT/CN2011/084792, filed on Dec. 28, 2011.

(51) Int. Cl.
*H04B 10/08* (2006.01)
*H04B 10/564* (2013.01)
(Continued)

(52) U.S. Cl.
CPC ........ *H04B 10/564* (2013.01); *H04B 10/07953* (2013.01); *H04B 10/07955* (2013.01); *H04B 10/294* (2013.01); *H04B 10/2931* (2013.01); *H04B 10/2935* (2013.01); *H04J 14/0221* (2013.01); *H04J 14/0261* (2013.01);
(Continued)

(58) Field of Classification Search
CPC ............... H04B 10/0795; H04B 10/07953; H04B 10/07955; H04B 10/564
See application file for complete search history.

(56) References Cited

U.S. PATENT DOCUMENTS 6,654,561 B1 * 11/2003 Terahara et al. ................. 398/26
6,961,524 B1 * 11/2005 Foo ............................... 398/197
(Continued)

FOREIGN PATENT DOCUMENTS

CN 1601930 3/2005
CN 1627670 6/2005
(Continued)

OTHER PUBLICATIONS

Fang, Lai-Fu et al.,"Experiment Research and Simulation of New Dynamic Equalization Method of Optical Channel in Optical Network," China Academic Journal Electronic Publishing House, 5 pages, Dec. 2000.

*Primary Examiner* — Dzung Tran
(74) *Attorney, Agent, or Firm* — Slater & Matsil, L.L.P.

(57) ABSTRACT

Embodiments of the present invention provide a method and an apparatus for equalizing link performance, and relate to the field of optical wavelength division multiplexing. In the present invention, target input power spectra and target output power spectra in all OMS sections in a network and single wave attenuation at a power adjusting point may be concurrently calculated based on link information of the OMS sections, fast adjustment may also be implemented for a complex network topology, and the adjustment may be implemented in a one-off manner to avoid a problem that iteration adjustment is caused by mutual impact of power adjusting points during serial adjustment in a ring network. In addition, it is not required to connect an optical path in the calculation phase, thereby eliminating reliance on a connected optical path in a process for equalizing link performance.

12 Claims, 4 Drawing Sheets

(51) Int. Cl.
*H04J 14/02* (2006.01)
*H04B 10/293* (2013.01)
*H04B 10/079* (2013.01)
*H04B 10/294* (2013.01)

(52) U.S. Cl.
CPC .................. *H04Q2213/1301* (2013.01); *H04Q 2213/1308* (2013.01)

(56) References Cited

U.S. PATENT DOCUMENTS

| 7,274,875 | B2* | 9/2007 | Youn et al. ...................... 398/79 |
| 2002/0154359 | A1 | 10/2002 | Tsuda et al. |
| 2003/0081283 | A1* | 5/2003 | Ishizuka et al. ............... 359/124 |
| 2003/0231886 | A1* | 12/2003 | Young et al. .................. 398/101 |
| 2004/0100684 | A1* | 5/2004 | Jones et al. ............... 359/337.11 |
| 2007/0104491 | A1* | 5/2007 | Hainberger et al. .......... 398/175 |
| 2008/0273876 | A1* | 11/2008 | Lundquist et al. .............. 398/59 |

FOREIGN PATENT DOCUMENTS

| CN | 101043288 | 9/2007 |
| CN | 101159506 A | 4/2008 |
| CN | 101364845 | 2/2009 |
| CN | 101505190 | 8/2009 |
| CN | 101714901 | 5/2010 |
| CN | 102263591 | 11/2011 |
| CN | 102281110 | 12/2011 |
| EP | 2654221 | 10/2013 |
| JP | 2003051632 | 2/2003 |

* cited by examiner

METHOD AND APPARATUS FOR EQUALIZING LINK PERFORMANCE

This application is a continuation of International Application No. PCT/CN2011/084792, filed on Dec. 28, 2011, which is hereby incorporated by reference in its entirety.

TECHNICAL FIELD

The present invention relates to the field of optical wavelength division multiplexing, and in particular, to a method and an apparatus for equalizing link performance.

BACKGROUND

In a WDM (Wavelength Division Multiplexing) system, light of different wavelengths is transmitted in a link. Because of SRS (Stimulated Raman Scattering), optical power of a short wavelength transfers to optical power of a long wavelength. In addition, a gain spectrum and noise figure spectrum of an OA (Optical Amplifier) in the link are not flat for all wavelengths, and loss of different wavelengths caused by the link is not consistent. Therefore, for signals of different wavelengths, though with the same power and OSNR (Optical Signal to Noise Ratio) at a transmitter end, the power and OSNR may be substantially different after long-distance transmission, resulting in substantially different service performance of different wavelengths received at a receiver end. In the WDM system, the performance of a link is constrained by a wavelength with the worst transmission performance carried by the link. Therefore it is crucial to equalize transmission performance of wavelengths in a link through adjusting optical power of the wavelengths.

In practice, to enable different wavelengths in a same optical fiber to have the same or similar transmission performance, an equalization operation needs to be performed only on optical power and optical signal to noise ratios of the different wavelengths to ensure that the wavelengths have the same or similar transmission performance. Currently, an OSNR equalization subsystem and optical power equalization subsystem are arranged at each adjusting point in an optical link. The OSNR equalization subsystem detects OSNR differences between wavelengths, compares OSNRs of the wavelengths with a stored OSNR reference value, and increases or attenuates the OSNRs of the wavelengths to the OSNR reference value according to a comparison result. After the OSNRs of the wavelengths are equalized, the optical power equalization subsystem detects optical power of all wavelengths, compares the optical power of the wavelengths with a stored optical power reference value, and increases or attenuates the optical power of the wavelengths to the optical power reference value.

In a practical application, the prior art has a problem because, as adjustment at a previous adjusting point affects an optical power change at a next adjusting point, only serial adjustment can be performed on each adjusting point, and for a complex ring network, an adjustment process is an iteration process, and is rather time-consuming. In addition, as each adjusting point makes adjustment while performing detection, the adjustment may only be carried out after an optical path is connected.

SUMMARY

To improve efficiency in equalizing link performance, and eliminate reliance on a connected optical path in a process for equalizing link performance, embodiments of the present invention provide a method and an apparatus for equalizing link performance. The technical solutions are as follows:

A method for equalizing link performance including obtaining link information of any optical multiplexing section in an optical wavelength division multiplexing system, and calculating input power of each wavelength of each optical amplifier in the any optical multiplexing section according to the link information of the any optical multiplexing section, is provided. An optical signal to noise ratio degradation amount of each wavelength is calculated according to the input power of each wavelength of each optical amplifier in the any optical multiplexing section. When a difference between optical signal to noise ratio degradation amounts of wavelengths is within a preset threshold range, an output power of each wavelength of a last optical amplifier in the any optical multiplexing section is calculated, and when a difference between output power of wavelengths in the last optical amplifier of the any optical multiplexing section is within a preset threshold range, using the input power of each wavelength of a first optical amplifier and the output power of each wavelength of the last optical amplifier in the any optical multiplexing section as target input power and target output power in the any optical multiplexing section. A target input power and a target output power of each wavelength in a next optical multiplexing section of the any optical multiplexing section is calculated by using a same method for calculating the target input power and the target output power of each wavelength in the any optical multiplexing section. A single wave attenuation of each wavelength caused by a power adjusting point between the any optical multiplexing section and the next optical multiplexing section is determined according to the target output power of each wavelength in the any optical multiplexing section and the target input power of each wavelength in the next optical multiplexing section.

An apparatus for equalizing link performance comprising an input power calculating module configured to obtain link information of any optical multiplexing section in an optical wavelength division multiplexing system, and calculate input power of each wavelength of each optical amplifier in the any optical multiplexing section according to the link information of the any optical multiplexing section is provided. An optical signal to noise ratio degradation amount calculating module is configured to calculate an optical signal to noise ratio degradation amount of each wavelength according to the input power of each wavelength of each optical amplifier in the any optical multiplexing section. A target power calculating module is configured to, when a difference between optical signal to noise ratio degradation amounts of wavelengths is within a preset threshold range, calculate an output power of each wavelength of a last optical amplifier in the any optical multiplexing section, and, when a difference between an output power of wavelengths in the last optical amplifier of the any optical multiplexing section is within a preset threshold range, use the input power of each wavelength of a first optical amplifier and the output power of each wavelength of the last optical amplifier in the any optical multiplexing section as target input power and target output power in the any optical multiplexing section. The target power calculating module is further configured to calculate target input power and target output power of each wavelength in a next optical multiplexing section of the any optical multiplexing section by using a same method for calculating the target input power and the target output power of each wavelength in the any optical multiplexing section. A single wave attenuation module is configured to determine single wave attenuation of each wavelength caused by a power adjusting point between the any optical multiplexing section and the next optical multiplexing section according to the target output power of each wavelength in the any optical multiplexing section and the target input power of each wavelength in the next optical multiplexing section.

Beneficial effects of the technical solutions provided by embodiments of the present invention are as follows: Target input power spectra and target output power spectra in all OMS sections in a network and single wave attenuation at a power adjusting point may be concurrently calculated based on link information of the optical multiplexing sections; fast adjustment may also be implemented for a complex network topology; and the adjustment may be implemented in a one-off manner to avoid a problem that iteration adjustment is caused by mutual impact of power adjusting points during serial adjustment in a ring network. In addition, it is not required to connect an optical path in the calculation phase, thereby eliminating reliance on a connected optical path in a process for equalizing link performance.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DETAILED DESCRIPTION OF ILLUSTRATIVE EMBODIMENTS

To make the objectives, technical solutions, and advantages of the present invention more comprehensible, the following further describes the embodiments of the present invention in detail with reference to the accompanying drawings.

Embodiment 1

Figure 1:
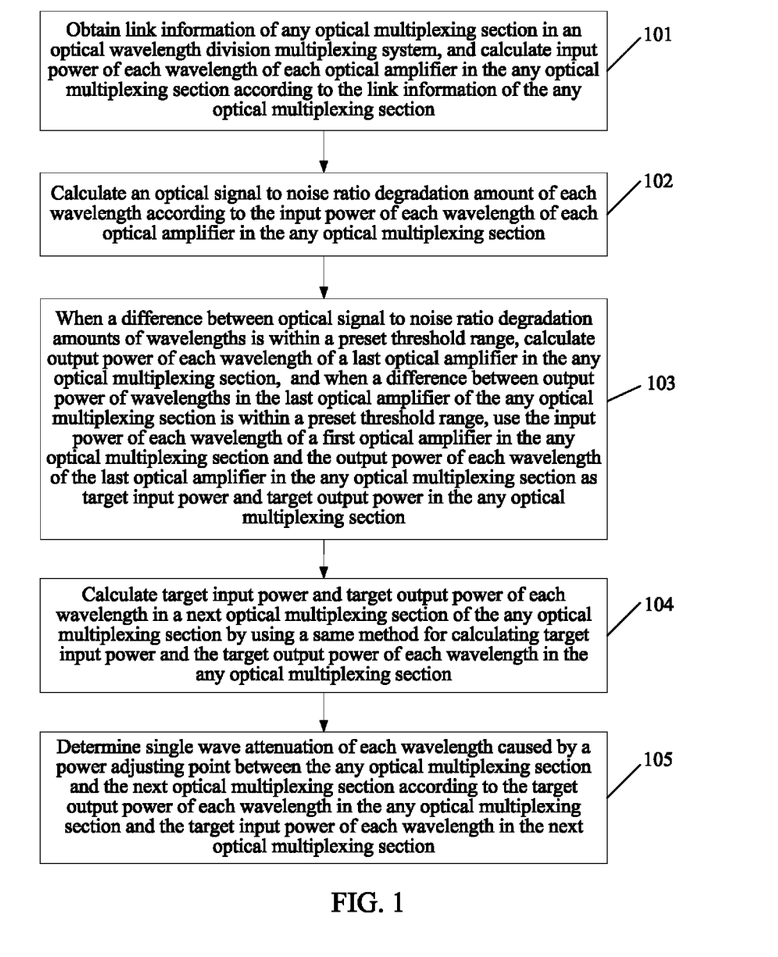
FIG. 1 is a flow chart of a method for equalizing link performance according to Embodiment 1 of the present invention.

Referring to FIG. 1, this embodiment provides a method for equalizing link performance, which includes the following steps.

In step 101 obtain link information of any OMS (Optical Multiplexing Section) in an optical wavelength division multiplexing system, and calculate input power of each wavelength of each optical amplifier in the any optical multiplexing section according to the link information of the any optical multiplexing section.

In step 102 calculate an optical signal to noise ratio degradation amount of each wavelength according to the input power of each wavelength of each optical amplifier in the any optical multiplexing section.

In step 103 when a difference between optical signal to noise ratio degradation amounts of wavelengths is within a preset threshold range, calculate output power of each wavelength of a last optical amplifier in the any optical multiplexing section, and when a difference between output power of wavelengths in the last optical amplifier of the any optical multiplexing section is within a preset threshold range, use the input power of each wavelength of a first optical amplifier and the output power of each wavelength of the last optical amplifier in the any optical multiplexing section as target input power and target output power in the any optical multiplexing section.

In step 104 calculate target input power and target output power of each wavelength in a next optical multiplexing section of the any optical multiplexing section by using a same method for calculating the target input power and the target output power of each wavelength in the any optical multiplexing section.

In step 105 determine single wave attenuation of each wavelength caused by a power adjusting point between the any optical multiplexing section and the next optical multiplexing section according to the target output power of each wavelength in the any optical multiplexing section and the target input power of each wavelength in the next optical multiplexing section.

In this embodiment, target input power spectra and target output power spectra in all OMS sections in a network and single wave attenuation at a power adjusting point may be concurrently calculated based on link information of the OMS sections. Fast adjustment may also be implemented for a complex network topology, and the adjustment may be implemented in a one-off manner to avoid a problem that iteration adjustment is caused by mutual impact of power adjusting points during serial adjustment in a ring network. In addition, it is not required to connect an optical path in the calculation phase, thereby eliminating reliance on a connected optical path in a process for equalizing link performance.

Embodiment 2

Figure 2:
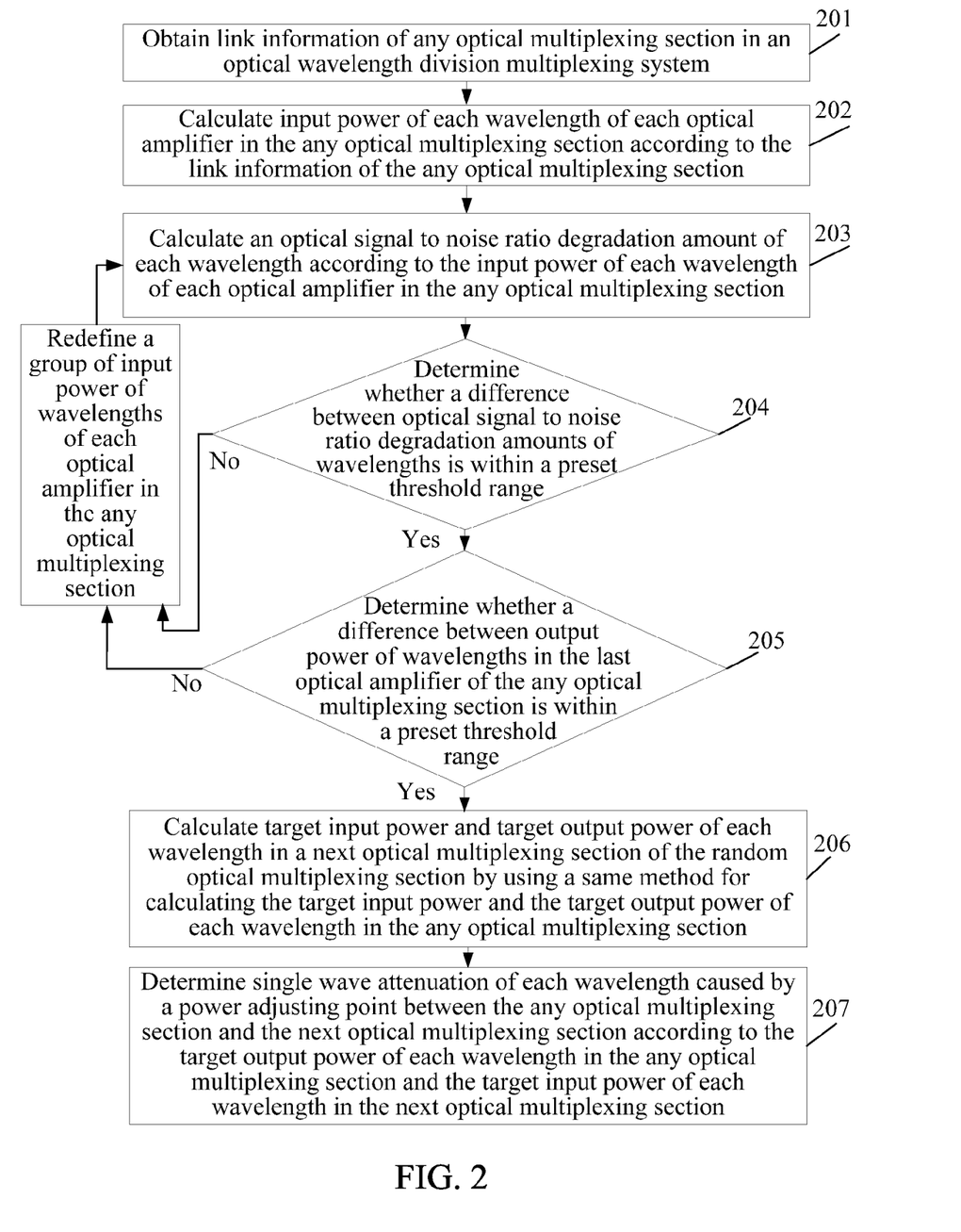
FIG. 2 is a flow chart of a method for equalizing link performance according to Embodiment 2 of the present invention.

Referring to FIG. 2, this embodiment provides a method for equalizing link performance, which comprises the following steps.

In step 201 obtain link information of any optical multiplexing section in an optical wavelength division multiplexing system. In an embodiment the link information includes wavelength distribution, link loss, a type of the optical amplifier, a gain of each wavelength caused by the optical amplifier, and the like. In this embodiment, the any optical multiplexing section is set to OMS (i). Use FIG. 3 as an example. There are three power adjusting points in FIG. 3, namely, OEQ-A, OEQ-B, OEQ-C, and the section between OEQ-A and OEQ-B is set to OMS (i).

In step 202 calculate input power of each wavelength of each optical amplifier in the any optical multiplexing section according to the link information of the any optical multiplexing section. In an embodiment step 202 comprises a step 202a, a step 202b, and a step 202c. In step 202a determine typical input optical power of a first optical amplifier according to a type of the first optical amplifier in the any optical multiplexing section, average gain of wavelengths caused by the first optical amplifier, and the number of full wavelengths in the optical wavelength division multiplexing system, and use the typical input optical power of the first optical amplifier as input power of the first optical amplifier. The average gain of the wavelengths caused by the first optical amplifier is obtained by averaging a sum of the gains of the wavelengths caused by the first optical amplifier.

For example, the average gain of wavelengths caused by a type of optical amplifier is 20 db, and the typical input optical power of the optical amplifier is −20 dbm in an optical wavelength division multiplexing system with the number of full wavelengths being 40, namely, for each wavelength, the typical input optical power of the optical amplifier is −20 dbm. The typical input optical power is input power which enables an optical amplifier to work in the best state, and in specific implementation, it may be set that the best work state is a state in which a certain threshold range is satisfied. The typical input optical power is a performance reference value of an optical amplifier, and the typical input optical power of the optical amplifier is the same for different wavelengths.

In step 202b calculate output power of each wavelength of the first optical amplifier according to the input power of the first optical amplifier and the gain of each wavelength caused by the first optical amplifier, and calculate input power of each wavelength of a second optical amplifier according to the following formula:

$$P_{inF}^{\lambda_k} - L_{F-X} = P_{inX}^{\lambda_k};$$

where $P_{inF}^{\lambda_k}$ indicates output power of each wavelength $\lambda_k$ in a previous optical amplifier F, $L_{F-X}$ indicates link loss of a wavelength between the previous optical amplifier F and a next optical amplifier X, and $P_{inX}^{\lambda_k}$ indicates input power of each wavelength $\lambda_k$ in the next optical amplifier X.

In step 202c calculate input power of each wavelength of each optical amplifier in the any optical multiplexing section by using a same method for calculating the input power of each wavelength of the second optical amplifier.

In step 203 calculate an optical signal to noise ratio degradation amount of each wavelength according to the input power of each wavelength of each optical amplifier in the any optical multiplexing section, In an embodiment, the optical signal to noise ratio degradation amount of each wavelength is calculated according to the following formula:

$$S(\lambda_k) = \frac{NF_1(\lambda_k)hv_k B}{P_{in1}^{\lambda_k}} + \frac{NF_2(\lambda_k)hv_k B}{P_{in2}^{\lambda_k}} + \ldots + \frac{NF_N(\lambda_k)hv_k B}{P_{inN}^{\lambda_k}}$$

where $\lambda_k$ is a $k^{th}$ wavelength, $S(\lambda_k)$ indicates an optical signal to noise ratio degradation amount of $\lambda_k$, $P_{inN}^{\lambda_k}$ is input power of $\lambda_k$ of an $N^{th}$ optical amplifier in the any optical multiplexing section, $NF_N(\lambda_k)$ is a noise figure of the $N^{th}$ optical amplifier to $\lambda_k$, which relates to the input power and a gain in the $N^{th}$ optical amplifier, and is usually provided by an equipment manufacturer, B is a filter bandwidth, h is a Planck constant, and $v_k$ is a frequency of signal light with the wavelength of $\lambda_k$.

In step 204 determine whether a difference between optical signal to noise ratio degradation amounts of wavelengths is within a preset threshold range. If it is within the preset threshold range, perform step 205. If it is not within the preset threshold range, redefine a group of input power of wavelengths of each optical amplifier in the any optical multiplexing section, and perform step 203.

In this embodiment, a method for redefining the group of input power of the wavelengths of each optical amplifier in the any optical multiplexing section is not limited, and the following provides a feasible method as an example. For example, first, an average value of the optical signal to noise ratio degradation amount of wavelengths is determined, and if an optical signal to noise ratio degradation amount of a wavelength is smaller than the average value, input power of the wavelength in all optical amplifiers may be increased, and a specific increased value may be preset based on experience.

In step 205 calculate output power of each wavelength of the last optical amplifier in the any optical multiplexing section, and determine whether a difference between output power of wavelengths in the last optical amplifier of the any optical multiplexing section is within a preset threshold range. If it is within the preset threshold range, use the input power of each wavelength of the first optical amplifier and the output power of each wavelength of the last optical amplifier in the any optical multiplexing section as target input power and target output power in the any optical multiplexing section. If it is not within the preset threshold range, redefine a group of input power of wavelengths of each optical amplifier in the any optical multiplexing section, and perform step 203.

In an embodiment the calculating output power of each wavelength of the last optical amplifier in the any optical multiplexing section specifically includes calculating output power of each wavelength of the last optical amplifier according to the input power of each wavelength of the last optical amplifier in the any optical multiplexing section and the gain of each wavelength caused by the last optical amplifier.

In step 206 calculate target input power and target output power of each wavelength in a next optical multiplexing section of the any optical multiplexing section by using a same method for calculating the target input power and the target output power of each wavelength in the any optical multiplexing section.

Figure 3:
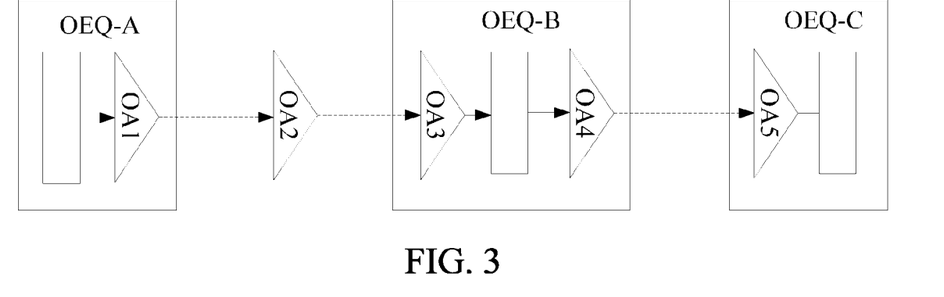
FIG. 3 is a schematic diagram of a part of an optical multiplexing section in an optical wavelength division multiplexing system according to Embodiment 2 of the present invention.

For example, as shown in FIG. 3, if the section between OEQ-A and OEQ-B is the any optical multiplexing section OMS (i), then the section between OEQ-B and OEQ-C is the next optical multiplexing section OMS (i+1).

In step 207 determine single wave attenuation of each wavelength caused by a power adjusting point between the any optical multiplexing section and the next optical multiplexing section according to the target output power of each wavelength in the any optical multiplexing section and the target input power of each wavelength in the next optical multiplexing section.

Specifically, a difference between the target output power of each wavelength in the any optical multiplexing section and the target input power of each wavelength in the next optical multiplexing section is used as the single wave attenuation of each wavelength caused by the power adjusting point. A formula is as follows:

$$P_{outF}^{\lambda_k} - P_{inX}^{\lambda_k} = A_{F-X}^{\lambda_k}$$

where $P_{outF}^{\lambda_k}$ indicates target output power of a wavelength $\lambda_k$ in a previous optical multiplexing section F, $P_{inX}^{\lambda_k}$ indicates target input power of the wavelength $\lambda_k$ in a next optical multiplexing section X, and $A_{F-X}^{\lambda_k}$ is single wave attenuation of the wavelength $\lambda_k$ caused by a power adjusting point between the previous optical multiplexing section F and the next optical multiplexing section X.

In this embodiment, target input power spectra and target output power spectra in all OMS sections in a network and single wave attenuation at a power adjusting point may be concurrently calculated based on link information of the OMS sections, fast adjustment may also be implemented for a complex network topology, and the adjustment may be implemented in a one-off manner to avoid a problem that iteration adjustment is caused by mutual impact of power adjusting points during serial adjustment in a ring network.

Embodiment 3

Figure 4:
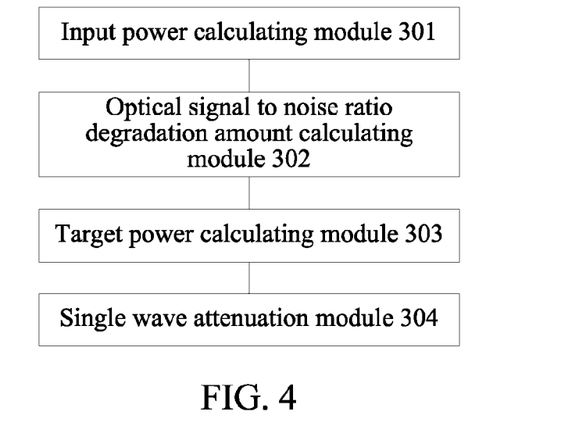
FIG. 4 is a schematic structural diagram of an apparatus for equalizing link performance according to Embodiment 3 of the present invention.

Referring to FIG. 4, this embodiment provides an apparatus for equalizing link performance and comprises an input power calculating module 301 configured to obtain link information of any optical multiplexing section in an optical wavelength division multiplexing system, and calculate input power of each wavelength of each optical amplifier in the any optical multiplexing section according to the link information of the any optical multiplexing section. An optical signal to noise ratio degradation amount calculating module 302 is configured to calculate an optical signal to noise ratio degradation amount of each wavelength according to the input power of each wavelength of each optical amplifier in the any optical multiplexing section. A target power calculating module 303 is configured to, when a difference between optical signal to noise ratio degradation amounts of wavelengths is within a preset threshold range, calculate output power of each wavelength of a last optical amplifier in the any optical multiplexing section, and, when a difference between output power of wavelengths in the last optical amplifier of the any optical multiplexing section is within a preset threshold range, use the input power of each wavelength of a first optical amplifier and the output power of each wavelength of the last optical amplifier in the any optical multiplexing section as target input power and target output power in the any optical multiplexing section. The target power calculating module 303 is further configured to calculate target input power and target output power of each wavelength in a next optical multiplexing section of the any optical multiplexing section by using a same method for calculating the target input power and the target output power of each wavelength in the any optical multiplexing section. Aa single wave attenuation module 304 is configured to determine single wave attenuation of each wavelength caused by a power adjusting point between the any optical multiplexing section and the next optical multiplexing section according to the target output power of each wavelength in the any optical multiplexing section and the target input power of each wavelength in the next optical multiplexing section.

In an embodiment the link information includes wavelength distribution, link loss, a type of the optical amplifier, and a gain of each wavelength caused by the optical amplifier.

Figure 5:
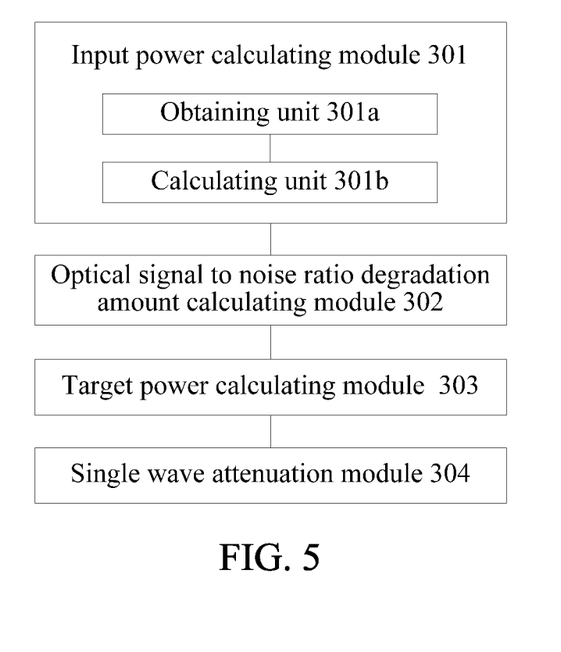
FIG. 5 is another schematic structural diagram of an apparatus for equalizing link performance according to Embodiment 3 of the present invention.

Referring to FIG. 5, the input power calculating module 301 comprises an obtaining unit 301a and a calculating unit 301b. The obtaining unit 301a is configured to obtain the link information of the any optical multiplexing section in the optical wavelength division multiplexing system.

The calculating unit 301b is configured to determine a typical input optical power of a first optical amplifier according to a type of the first optical amplifier in the any optical multiplexing section, an average gain of wavelengths caused by the first optical amplifier, and the number of full wavelengths in the optical wavelength division multiplexing system, and use the typical input optical power of the first optical amplifier as input power of the first optical amplifier, where the average gain of the wavelengths caused by the first optical amplifier is obtained by averaging a sum of the gains of the wavelengths caused by the first optical amplifier. The calculating unit 301b is also configured to calculate output power of each wavelength of the first optical amplifier according to the input power of the first optical amplifier and the gain of each wavelength caused by the first optical amplifier. The calculating unit 301b is also configured to calculate an input power of each wavelength of a second optical amplifier according to the following formula:

$$P_{inF}^{\lambda_k} - L_{F-X} = P_{inX}^{\lambda_k}$$

where $P_{inF}^{\lambda_k}$ indicates output power of a wavelength $\lambda_k$ in a previous optical amplifier F, $L_{F-X}$ indicates link loss of a wavelength between the previous optical amplifier F and a next optical amplifier X, and $P_{inX}^{\lambda_k}$ indicates input power of the wavelength $\lambda_k$ in the next optical amplifier X; and calculate input power of each wavelength of each optical amplifier in the any optical multiplexing section by using a same method for calculating the input power of each wavelength of the second optical amplifier.

The optical signal to noise ratio degradation amount calculating module 302 is specifically configured to calculate the optical signal to noise ratio degradation amount of each wavelength according to the following formula:

$$S(\lambda_k) = \frac{NF_1(\lambda_k) h \upsilon_k B}{P_{in1}^{\lambda_k}} + \frac{NF_2(\lambda_k) h \upsilon_k B}{P_{in2}^{\lambda_k}} + \ldots + \frac{NF_N(\lambda_k) h \upsilon_k B}{P_{inN}^{\lambda_k}}$$

where $\lambda_k$ is a $k^{th}$ wavelength, $S(\lambda_k)$ indicates an optical signal to noise ratio degradation amount of $\lambda_k$, $P_{inN}^{\lambda_k}$ is input power of $\lambda_k$ of an $N^{th}$ optical amplifier in the any optical multiplexing section, $NF_N(\lambda_k)$ is a noise figure of the $N^{th}$ optical amplifier to $\lambda_k$, B is a filter bandwidth, h is a Planck constant, and $\upsilon_k$ is a frequency of signal light with the wavelength of $\lambda_k$.

The target power calculating module 303, when calculating output power of each wavelength of the last optical amplifier in the any optical multiplexing section, is specifically configured to calculate an output power of each wavelength of the last optical amplifier according to the input power of each wavelength of the last optical amplifier in the any optical multiplexing section and the gain of each wavelength caused by the last optical amplifier.

In an embodiment the single wave attenuation module 304 is specifically configured to use a difference between the target output power of each wavelength in the any optical multiplexing section and the target input power of each wavelength in the next optical multiplexing section as the single wave attenuation of each wavelength caused by the power adjusting point.

The optical signal to noise ratio degradation amount calculating module 302 is further configured to, when the difference between the optical signal to noise ratio degradation amounts of the wavelengths is not within a preset threshold range or when the difference between the output power of the wavelengths of the last optical amplifier in the any optical multiplexing section is not within a preset threshold range, redefine the input power of each wavelength of each optical amplifier in the any optical multiplexing section, and recalculate, according to the redefined input power of each wavelength of each optical amplifier in the any optical multiplexing section, the optical signal to noise ratio degradation amount of each wavelength.

In this embodiment, target input power spectra and target output power spectra in all OMS sections in a network and single wave attenuation at a power adjusting point may be concurrently calculated based on link information of the OMS sections, fast adjustment may also be implemented for a complex network topology, and the adjustment may be implemented in a one-off manner to avoid a problem that iteration adjustment is caused by mutual impact of power adjusting points during serial adjustment in a ring network.

A person of ordinary skill in the art may understand that all or a part of the steps of the foregoing embodiments may be implemented by hardware, and may also be implemented by a program instructing relevant hardware. The program may be stored in a computer readable storage medium. The foregoing storage medium may be a read-only memory, a magnetic disk, an optical disc, or the like.

The foregoing description is merely exemplary embodiments of the present invention, but is not intended to limit the present invention. Any modification, equivalent replacement, and improvement made within the spirit and principle of the present invention shall fall within the protection scope of the present invention.

What is claimed is:

1. A method for equalizing link performance, the method comprising:

obtaining link information of any optical multiplexing section in an optical wavelength division multiplexing system, and calculating an input power of each wavelength of each optical amplifier in the any optical multiplexing section according to the link information of the any optical multiplexing section;

calculating an optical signal to noise ratio degradation amount of each wavelength according to the input power of each wavelength of each optical amplifier in the any optical multiplexing section;

when a difference between optical signal to noise ratio degradation amounts of wavelengths is within a preset threshold range, calculating an output power of each wavelength of a last optical amplifier in the any optical multiplexing section, and when a difference between output power of wavelengths in the last optical amplifier of the any optical multiplexing section is within a preset threshold range, using the input power of each wavelength of a first optical amplifier and the output power of each wavelength of the last optical amplifier in the any optical multiplexing section as a target input power and a target output power in the any optical multiplexing section;

calculating target input power and target output power of each wavelength in a next optical multiplexing section of the any optical multiplexing section by using a same method for calculating the target input power and the target output power of each wavelength in the any optical multiplexing section; and determining single wave attenuation of each wavelength caused by a power adjusting point between the any optical multiplexing section and the next optical multiplexing section according to the target output power of each wavelength in the any optical multiplexing section and the target input power of each wavelength in the next optical multiplexing section.

2. The method according to claim 1, wherein the link information comprises wavelength distribution, link loss, a type of the optical amplifier, and a gain of each wavelength caused by the optical amplifier, and wherein the calculating input power of each wavelength of each optical amplifier in the any optical multiplexing section according to the link information of the any optical multiplexing section further comprises:

determining typical input optical power of the first optical amplifier according to a type of the first optical amplifier in the any optical multiplexing section, average gain of wavelengths caused by the first optical amplifier, and a number of full wavelengths in the optical wavelength division multiplexing system, and using the typical input optical power of the first optical amplifier as input power of the first optical amplifier, wherein the average gain of the wavelengths caused by the first optical amplifier is obtained by averaging a sum of the gains of the wavelengths caused by the first optical amplifier;

calculating output power of each wavelength of the first optical amplifier according to the input power of the first optical amplifier and the gain of each wavelength caused by the first optical amplifier, and calculating input power of each wavelength of a second optical amplifier according to a formula $P_{inF}^{\lambda_k} - L_{F-X} = P_{inX}^{\lambda_k}$, wherein $P_{inF}^{\lambda_k}$ indicates output power of each wavelength $\lambda_k$ in a previous optical amplifier F, $L_{F-X}$ indicates link loss of a wavelength between the previous optical amplifier F and a next optical amplifier X, and $P_{inX}^{\lambda_k}$ indicates input power of each wavelength $\lambda_k$ in the next optical amplifier X; and calculating input power of each wavelength of each optical amplifier in the any optical multiplexing section by using a same method for calculating the input power of each wavelength of the second optical amplifier.

3. The method according to claim 1, wherein the calculating an optical signal to noise ratio degradation amount of each wavelength according to the input power of each wavelength of each optical amplifier in the any optical multiplexing section further comprises calculating the optical signal to noise ratio degradation amount of each wavelength according to the following formula:

$$S(\lambda_k) = \frac{NF_1(\lambda_k)h\upsilon_k B}{P_{in1}^{\lambda_k}} + \frac{NF_2(\lambda_k)h\upsilon_k B}{P_{in2}^{\lambda_k}} + \ldots + \frac{NF_N(\lambda_k)h\upsilon_k B}{P_{inN}^{\lambda_k}}$$

wherein $\lambda_k$ is a $k^{th}$ wavelength, $S(\lambda_k)$ indicates an optical signal to noise ratio degradation amount of $\lambda_k$, $P_{inN}^{\lambda_k}$ is input power of $\lambda_k$ of an $N^{th}$ optical amplifier in the any optical multiplexing section, $NF_N(\lambda_k)$ is a noise figure of the $N^{th}$ optical amplifier to $\lambda_k$, B is a filter bandwidth, h is a Planck constant, and $\upsilon_k$ is a frequency of signal light with the wavelength of $\lambda_k$.

4. The method according to claim 1, wherein the calculating output power of each wavelength of a last optical amplifier in the any optical multiplexing section further comprises calculating output power of each wavelength of the last optical amplifier according to the input power of each wavelength of the last optical amplifier in the any optical multiplexing section and a gain of each wavelength caused by the last optical amplifier.

5. The method according to claim 1, wherein the determining single wave attenuation of each wavelength caused by a power adjusting point between the any optical multiplexing section and the next optical multiplexing section according to the target output power of each wavelength in the any optical multiplexing section and the target input power of each wavelength in the next optical multiplexing section further comprises using a difference between the target output power of each wavelength in the any optical multiplexing section and the target input power of each wavelength in the next optical multiplexing section as the single wave attenuation of each wavelength caused by the power adjusting point.

6. The method according to claim 1, wherein when the difference between the optical signal to noise ratio degradation amounts of the wavelengths is not within a preset threshold range, or when the difference between the output power of the wavelengths of the last optical amplifier in the any optical multiplexing section is not within a preset threshold range, the method further comprises redefining the input power of each wavelength of each optical amplifier in the any optical multiplexing section, and recalculating, according to the redefined input power of each wavelength of each optical amplifier in the any optical multiplexing section, the optical signal to noise ratio degradation amount of each wavelength.

7. An apparatus for equalizing link performance, comprising:
an input power calculating module configured to obtain link information of any optical multiplexing section in an optical wavelength division multiplexing system, and calculate input power of each wavelength of each optical amplifier in the any optical multiplexing section according to the link information of the any optical multiplexing section;
an optical signal to noise ratio degradation amount calculating module configured to calculate an optical signal to noise ratio degradation amount of each wavelength according to the input power of each wavelength of each optical amplifier in the any optical multiplexing section;
a target power calculating module, configured to, when a difference between the optical signal to noise ratio degradation amounts of wavelengths is within a preset threshold range, calculate output power of each wavelength of a last optical amplifier in the any optical multiplexing section, and when a difference between the output power of wavelengths in the last optical amplifier of the any optical multiplexing section is within a preset threshold range, use the input power of each wavelength of a first optical amplifier and the output power of each wavelength of the last optical amplifier in the any optical multiplexing section as a target input power and a target output power in the any optical multiplexing section, wherein the target power calculating module is further configured to calculate target input power and target output power of each wavelength in a next optical multiplexing section of the any optical multiplexing section by using a same method for calculating the target input power and the target output power of each wavelength in the any optical multiplexing section; and
a single wave attenuation module, configured to determine single wave attenuation of each wavelength caused by a power adjusting point between the any optical multiplexing section and the next optical multiplexing section according to the target output power of each wavelength in the any optical multiplexing section and the target input power of each wavelength in the next optical multiplexing section.

8. The apparatus according to claim 7, wherein the link information comprises wavelength distribution, link loss, a type of the optical amplifier, and a gain of each wavelength caused by the optical amplifier and wherein the input power calculating module comprises an obtaining unit and a calculating unit, wherein the obtaining unit is configured to obtain the link information of the any optical multiplexing section in the optical wavelength division multiplexing system, and wherein the calculating unit is configured to:
determine a typical input optical power of a first optical amplifier according to a type of the first optical amplifier in the any optical multiplexing section, an average gain of wavelengths caused by the first optical amplifier, and a number of full wavelengths in the optical wavelength division multiplexing system, and use the typical input optical power of the first optical amplifier as an input power of the first optical amplifier, wherein the average gain of the wavelengths caused by the first optical amplifier is obtained by averaging a sum of the gains of the wavelengths caused by the first optical amplifier;
calculate output power of each wavelength of the first optical amplifier according to the input power of the first optical amplifier and the gain of each wavelength caused by the first optical amplifier; and
calculate the input power of each wavelength of a second optical amplifier according to the following formula:

$$P_{inF}^{\lambda_k} - L_{F-X} = P_{inX}^{\lambda_k}$$

wherein $P_{inF}^{\lambda_k}$ indicates output power of a wavelength $\lambda_k$ in a previous optical amplifier F, $L_{F-X}$ indicates link loss of a wavelength between the previous optical amplifier F and a next optical amplifier X, and $P_{inX}^{\lambda_k}$ indicates input power of the wavelength $\lambda_k$ in the next optical amplifier X;
and calculate input power of each wavelength of each optical amplifier in the any optical multiplexing section by using a same method for calculating the input power of each wavelength of the second optical amplifier.

9. The apparatus according to claim 7, wherein the optical signal to noise ratio degradation amount calculating module is specifically configured to calculate the optical signal to noise ratio degradation amount of each wavelength according to the following formula:

$$S(\lambda_k) = \frac{NF_1(\lambda_k) h\upsilon_k B}{P_{in1}^{\lambda_k}} + \frac{NF_2(\lambda_k) h\upsilon_k B}{P_{in2}^{\lambda_k}} + \ldots + \frac{NF_N(\lambda_k) h\upsilon_k B}{P_{inN}^{\lambda_k}}$$

wherein $\lambda_k$ is a $k^{th}$ wavelength, $S(\lambda_k)$ indicates an optical signal to noise ratio degradation amount of $\lambda_k$, $P_{inN}^{\lambda_k}$ is input power of $\lambda_k$ of an $N^{th}$ optical amplifier in the any optical multiplexing section, $NF_N(\lambda_k)$ is a noise figure of the $N^{th}$ optical amplifier to $\lambda_k$, B is a filter bandwidth, h is a Planck constant, and $\upsilon_k$ is a frequency of signal light with the wavelength of $\lambda_k$.

10. The apparatus according to claim 7, wherein the target power calculating module, when calculating output power of each wavelength of a last optical amplifier in the any optical multiplexing section, is further configured to calculate output power of each wavelength of the last optical amplifier according to the input power of each wavelength of the last optical amplifier in the any optical multiplexing section and a gain of each wavelength caused by the last optical amplifier.

11. The apparatus according to claim 7, wherein the single wave attenuation module is further configured to use a difference between the target output power of each wavelength in the any optical multiplexing section and the target input power of each wavelength in the next optical multiplexing section as the single wave attenuation of each wavelength caused by the power adjusting point.

12. The apparatus according to claim 7, wherein the optical signal to noise ratio degradation amount calculating module is further configured to, when the difference between the optical signal to noise ratio degradation amounts of the wavelengths is not within a preset threshold range or when the difference between the output power of the wavelengths of the last optical amplifier in the any optical multiplexing section is not within a preset threshold range, redefine the input power of each wavelength of each optical amplifier in the any optical multiplexing section, and recalculate, according to the redefined input power of each wavelength of each optical amplifier in the any optical multiplexing section, the optical signal to noise ratio degradation amount of each wavelength.

* * * * *